United States Patent
Bartley et al.

(10) Patent No.: US 7,989,918 B2
(45) Date of Patent: Aug. 2, 2011

(54) IMPLEMENTING TAMPER EVIDENT AND RESISTANT DETECTION THROUGH MODULATION OF CAPACITANCE

(75) Inventors: Gerald Keith Bartley, Rochester, MN (US); Todd Alan Christensen, Rochester, MN (US); Paul Eric Dahlen, Rochester, MN (US); John Edward Sheets, II, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 12/359,484

(22) Filed: Jan. 26, 2009

(65) Prior Publication Data

US 2010/0187525 A1 Jul. 29, 2010

(51) Int. Cl.
*H01L 29/00* (2006.01)
(52) U.S. Cl. ......... 257/533; 257/E23.071; 257/E27.016; 257/E51.008
(58) Field of Classification Search .......... 257/301, 257/312, 528, 532, 533, E23.071, E27.016, 257/E51.008; 438/109, 243
See application file for complete search history.

(56) References Cited

U.S. PATENT DOCUMENTS

| | | | |
|---|---|---|---|
| 5,454,031 A * | 9/1995 | Gray et al. | 379/106.11 |
| 6,800,933 B1 | 10/2004 | Mathews et al. | |
| 7,157,372 B1 | 1/2007 | Trezza | |
| 2006/0278995 A1 | 12/2006 | Trezza | |
| 2006/0286775 A1 | 12/2006 | Singh et al. | |
| 2007/0007595 A1 | 1/2007 | Hirano et al. | |
| 2009/0085217 A1 * | 4/2009 | Knickerbocker et al. | 257/774 |

OTHER PUBLICATIONS

U.S. Appl. No. 112/186,837 filed Aug. 6, 2008 by Gerald Keith Bartley et al., entitled "Implementing Decoupling Capacitors With Hot-Spot Thermal Reduction on Integrated Circuit Chips".

* cited by examiner

*Primary Examiner* — Quoc D Hoang
(74) *Attorney, Agent, or Firm* — Joan Pennington

(57) ABSTRACT

A method and tamper detection circuit for implementing tamper and anti-reverse engineering evident detection in a semiconductor chip, and a design structure on which the subject circuit resides are provided. A capacitor is formed with the semiconductor chip including the circuitry to be protected. A change in the capacitor value results responsive to the semiconductor chip being thinned, which is detected and a tamper-detected signal is generated.

20 Claims, 3 Drawing Sheets

IMPLEMENTING TAMPER EVIDENT AND RESISTANT DETECTION THROUGH MODULATION OF CAPACITANCE

FIELD OF THE INVENTION

The present invention relates generally to the data processing field, and more particularly, relates to a method and tamper detection circuit for implementing tamper and anti-reverse engineering evident detection through modulation of a capacitance, and a design structure on which the subject circuit resides.

DESCRIPTION OF THE RELATED ART

One primary military concern associated with placing high technology on the battlefield is the risk of that technology falling into the enemy's hands. Sophisticated entities can possess sufficient expertise and capability to reverse engineer devices and components.

One method of reverse engineering a chip component is performed using high-energy photons, electrons, ions or a focused ion beam (FIB) to excite active portions of the chip, and then observe other chip portions that are affected. These processes when employed for the purposes of reverse engineering a component are done in a powered-on state in order to make the logic function.

Chip designers in the aerospace and defense (A&D) industry can implement effective techniques to mask or confuse attempts to probe the active side of the component, but the backside of the chip remains vulnerable to inspection by FIB, photons, or simple infrared observation.

Designers can make use of the fact that the component is powered on by designing into the chip a destruct mechanism capable of rendering it inexplicable when tampering occurs.

A need exists for an effective mechanism for implementing tamper and anti-reverse engineering evident detection for use with electronic circuitry and high-technology systems in various semiconductor chips or wafers.

SUMMARY OF THE INVENTION

Principal aspects of the present invention are to provide a method and tamper detection circuit for implementing tamper and anti-reverse engineering evident detection through modulation of a capacitance, and a design structure on which the subject circuit resides. Other important aspects of the present invention are to provide such method, circuit and design structure substantially without negative effect and that overcome many of the disadvantages of prior art arrangements.

In brief, a method and tamper detection circuit for implementing tamper and anti-reverse engineering evident detection in a semiconductor chip, and a design structure on which the subject circuit resides are provided. A capacitor is formed with the semiconductor chip including the circuitry to be protected. A change in the capacitor value results responsive to the semiconductor chip being thinned, which is detected and a tamper-detected signal is generated.

In accordance with features of the invention, when the silicon of the semiconductor chip is thinned, the parallel plate area between the conductors of the capacitor is reduced, thus causing the capacitance to decrease. A resistor and the capacitor provide an input to a ring oscillator. The ring oscillator includes a plurality of inverters connected together to form a ring with a last of the series of inverters connected by the resistor and the capacitor to an input of the first of the series inverters. When the capacitance value decreases responsive to the semiconductor chip being thinned, the ring oscillator begins to oscillate, providing the tamper-detected output signal.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method for sensing a tamper attempt and a tamper detection circuit are provided. The tamper detection circuit provides a tamper detect signal responsive to detecting a tampering event that, for example, is used for the destruction of circuitry to be protected in a semiconductor chip. This invention uses conventional destruct mechanisms; the invention is a novel structure and method for sensing a tamper attempt.

In accordance with features of the invention, a capacitor is formed coincident with a Thru-Silicon Via (TSV) technology with the semiconductor chip including the circuitry to be protected. The capacitor has a capacitance value that changes with thinning of the semiconductor chip provided in a tampering or reverse engineering process. Such change in capacitance value is detected by the tamper detection circuit, which provides the tamper detect signal. The capacitor is, for example, a conical capacitor.

In accordance with features of the invention, the tamper detect signal is the output signal provided by the tamper detection circuit, which is sent to available logic in the chip to make use of the current methods of obscuring chip function and chip self-destruct as the final effect related to sensing an attempt to reverse engineer the component.

Figure 1:
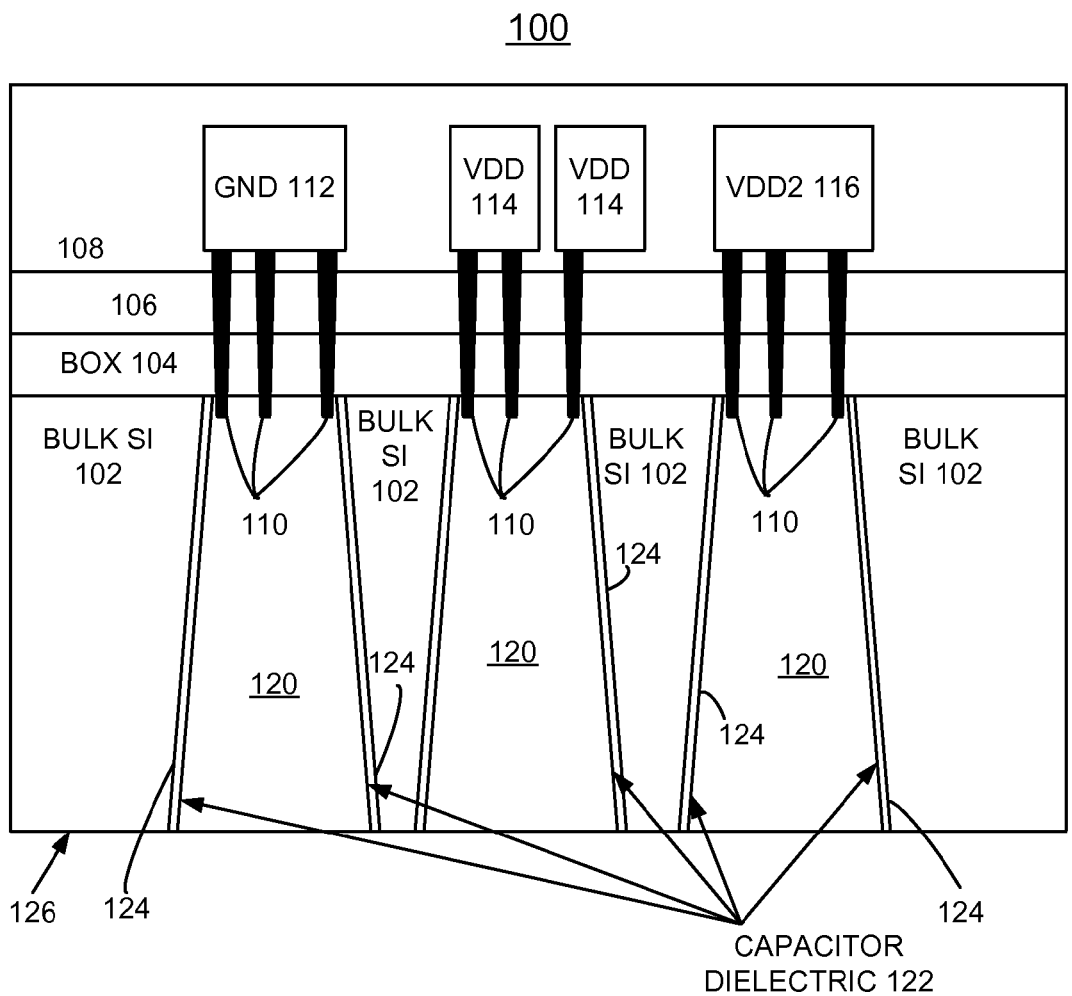
FIG. 1 is a schematic side plan view not to scale illustrating an example silicon-on-insulator (SOI) capacitor structure or capacitor in accordance with a preferred embodiment of the invention.

Having reference now to the drawings, in FIG. 1, there is shown an example silicon-on-insulator (SOI) capacitor structure generally designated by the reference character 100 in accordance with the preferred embodiment.

SOI capacitor structure 100 includes a silicon substrate layer 102, a thin buried oxide (BOX) layer 104 carried by the silicon substrate layer 102, an active layer or silicon layer 106 carried by the thin BOX layer 104, and a pad oxide 108 carried by the active layer 106.

SOI capacitor structure 100 includes a plurality of filled trenches 110. Topside processing of the SOI capacitor structure 100 includes forming the plurality of etched and filled trenches 110 through the pad oxide layer 108, the active layer 106, the BOX layer 104 to the silicon substrate layer 102. Each etched and filled trench 110 is filled with a thermal connection material that is thermally and electrically conductive. A respective wire level layer or conductor is provided for power supply rails and other connections including ground 112, a first voltage rail VDD 114, and a second voltage rail VDD2 116, as shown.

SOI capacitor structure 100 includes a plurality of filled trenches 120 having a capacitor dielectric 122 covering a plurality of respective trench sidewalls 124. Backside processing of the SOI capacitor structure 100 includes pattern and etching the plurality of trenches 120 into the silicon substrate layer 102 stopping on a boundary of the BOX layer 104. Each of the trenches 120 has a generally conical shape having a greater width proximate to a backside 126 of the SOI capacitor structure 100.

A selected one of a silicon dioxide $SiO_2$, a silicon nitride, a hafnium oxide, a nitrided hafnium, an oxynitride, a silicate, a polyimide or other organic dielectric is grown or deposited on the bulk silicon substrate layer 102 covering the trench sidewalls 124 forming the capacitor dielectric 122. A thermal connection and electrically conductive material 120 is deposited onto the capacitor dielectric 122 filling the etched openings or trenches. The thermal connection material fill 120 is a thermal and electrical conductor, such as tungsten. Alternatively the thermal and electrical conductor 120 includes a selected one of aluminum, copper, titanium and nickel.

Methods of deposition of the capacitor dielectric 122 and also the thermal connection material fill 120 include molecular beam epitaxy, chemical vapor deposition, atomic layer deposition, physical vapor deposition, and electrochemical vapor deposition.

While the illustrated SOI capacitor structure 100 includes a generally conical shape having a greater width proximate to the backside 126 of the SOI capacitor structure 100, it should be understood that the present invention is not limited to a capacitor having the conical shape. It should be understood that various other shapes or combinations of shapes can be provided for the capacitor in accordance with the present invention. For example, the capacitor of the invention could be square, rectangular, elliptical, other pipet-like structure or made up of several shapes or combinations of the same shape.

It should be understood that various other processes could be used to form the capacitor in accordance with the present invention. For example, the capacitor of the invention could be formed entirely by topside processing without a backside opening. It should be understood that the capacitor of the invention is not required to extend all the way through the bulk silicon 102. The capacitor of the invention should extend far enough into the bulk silicon 102 so that as the silicon is thinned, the capacitance value will change and be measurable before reverse engineering tools, such as FIB, become effective.

Figure 2:
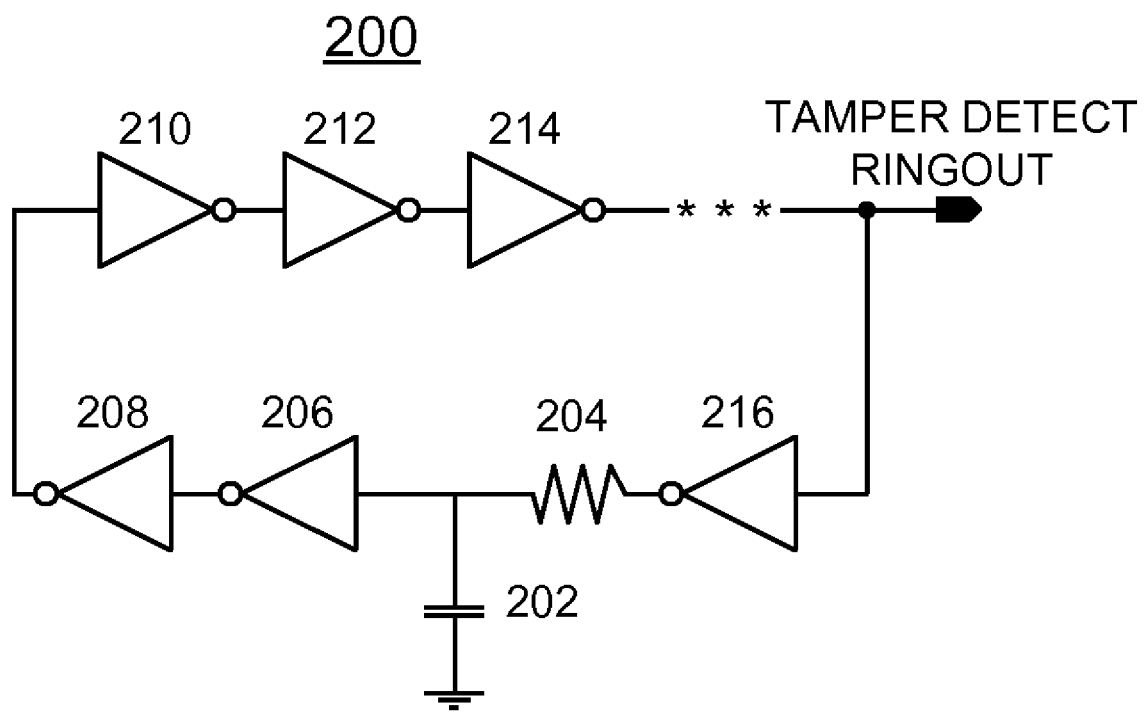
FIG. 2 is a schematic diagram representation illustrating an example tamper detection circuit for implementing tamper and anti-reverse engineering evident detection using the SOI capacitor structure of FIG. 1 in accordance with the preferred embodiment.

Referring now to FIG. 2, there is shown an example tamper detection circuit for implementing tamper and anti-reverse engineering evident detection generally designated by the reference character 200 using the SOI capacitor structure 100 of FIG. 1.

Tamper detection circuit 200 detects a predefined capacitance value change in the SOI capacitor structure 100 and includes an inverter string that begins to oscillate providing an output signal TAMPER DETECT RINGSOUT, which is used, for example, to enable the destruction of sensitive circuitry on the semiconductor chip. Ring oscillators typically include a series of devices or stages connected together to form a ring with a feedback path provided from the output of a last of the series of devices to an input of a first of the series of devices.

Tamper detection circuit 200 includes a capacitor 202 formed, for example, using the SOI capacitor structure 100 of FIG. 1. A resistor 204 is connected to one side of the capacitor 202 with the other side of the capacitor 202 connected to ground. Tamper detection circuit 200 includes a plurality of inverters 206, 208, 210, 212, 214, 216 connected together to form a ring with a last of the series of inverters 216 connected by the resistor 204 and capacitor 202 to an input of the first of the series inverters 206.

Tamper detection circuit 200 detects a tampering event and generates the output signal TAMPER DETECT RINGSOUT sent to logic in the semiconductor chip to take predetermined action, such as activating dummy circuits, obscuring chip function, up to and including the destruction of the chip As the silicon is thinned of a semiconductor chip including circuitry to be protected and SOI capacitor structure 100, the parallel plate area between the conductors of the capacitor structure 100 is reduced, thus causing the capacitance to decrease. Tamper detection circuit 200 is used to detect such an event and to generate the output signal used for the destruction of the circuitry to be protected. When the capacitance becomes small enough, the ring oscillator inverter string provided by tamper detection circuit 200 begins to oscillate, providing the corresponding output signal TAMPER DETECT RINGSOUT.

It should be understood that various different possible circuits can be used to detect the capacitance change, for example, simple capacitance dividers could also be used.

Figure 3:
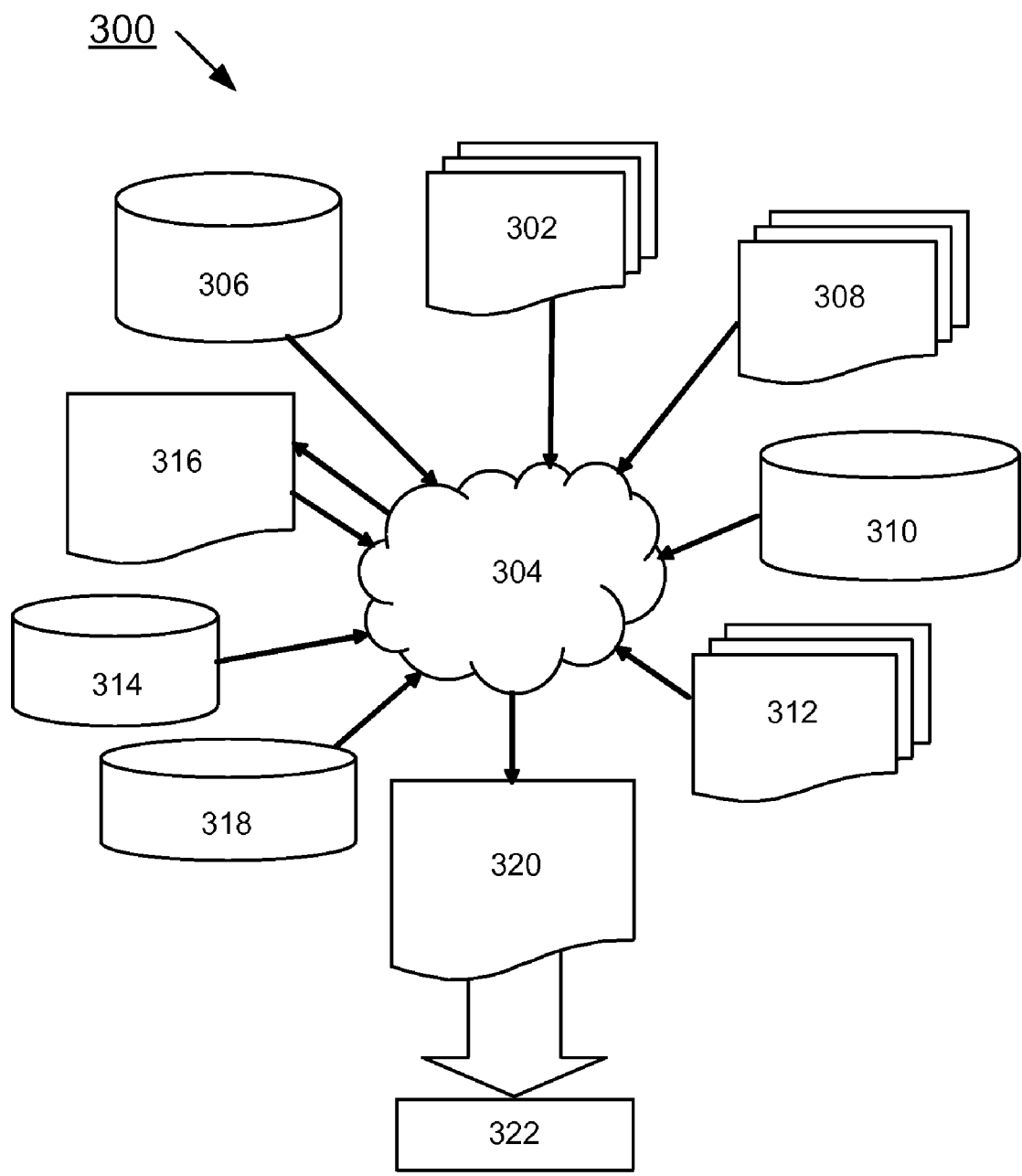
FIG. 3 is a flow diagram of a design process used in semiconductor design, manufacturing, and/or test.

FIG. 3 shows a block diagram of an example design flow 300. Design flow 300 may vary depending on the type of IC being designed. For example, a design flow 300 for building an application specific IC (ASIC) may differ from a design flow 300 for designing a standard component. Design structure 302 is preferably an input to a design process 304 and may come from an IP provider, a core developer, or other design company or may be generated by the operator of the design flow, or from other sources. Design structure 302 comprises circuit 200 in the form of schematics or HDL, a hardware-description language, for example, Verilog, VHDL, C, and the like. Design structure 302 may be contained on one or more machine readable medium. For example, design structure 302 may be a text file or a graphical representation of circuit 200. Design process 304 preferably synthesizes, or translates, circuit 200 into a netlist 306, where netlist 306 is, for example, a list of wires, transistors, logic gates, control circuits, I/O, models, etc. that describes the connections to other elements and circuits in an integrated circuit design and recorded on at least one of machine readable medium. This may be an iterative process in which netlist 306 is resynthesized one or more times depending on design specifications and parameters for the circuits.

Design process 304 may include using a variety of inputs; for example, inputs from library elements 303 which may house a set of commonly used elements, circuits, and devices, including models, layouts, and symbolic representations, for a given manufacturing technology, such as different technology nodes, 32 nm, 45 nm, 90 nm, and the like, design specifications 310, characterization data 312, verification data 314, design rules 316, and test data files 313, which may include test patterns and other testing information. Design process 304 may further include, for example, standard circuit design processes such as timing analysis, verification, design rule checking, place and route operations, and the like. One of ordinary skill in the art of integrated circuit design can appreciate the extent of possible electronic design automation tools and applications used in design process 304 without deviating from the scope and spirit of the invention. The design structure of the invention is not limited to any specific design flow.

Design process 304 preferably translates an embodiment of the invention as shown in FIG. 2 along with any additional integrated circuit design or data (if applicable), into a second design structure 320. Design structure 320 resides on a storage medium in a data format used for the exchange of layout data of integrated circuits, for example, information stored in a GDSII (GDS2), GL1, OASIS, or any other suitable format for storing such design structures. Design structure 320 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 2. Design structure 320 may then proceed to a stage 322 where, for example, design structure 320 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A tamper detection circuit for implementing tamper and anti-reverse engineering evident detection in a semiconductor chip comprising:
   a capacitor, said capacitor being formed with the semiconductor chip including circuitry to be protected;
   said capacitor having a changed capacitance value responsive to the semiconductor chip being thinned, said changed capacitance value indicating a tampering event in the semiconductor chip; and
   ring oscillator circuitry including a plurality of inverters series connected in a ring with a last of the series of inverters coupled to said capacitor and coupled by a resistor to an input of the first of the series inverters; said ring oscillator circuitry detecting said changed capacitance value; oscillating and generating a tamper-detected signal.

2. A tamper detection circuit for implementing tamper and anti-reverse engineering evident detection in a semiconductor chip comprising:
   a capacitor, said capacitor being formed with the semiconductor chip including circuitry to be protected; said capacitor including a conical capacitor structure, said conical capacitor structure including an etched trench extending from proximate to the backside of a silicon-on-insulator (SOI) structure into a silicon substrate layer to a buried oxide layer, a capacitor dielectric formed on sidewalls of said backside etched trench, and a thermal and electrical conductor deposited on said capacitor dielectric filling said etched trench;
   said capacitor having a changed capacitance value responsive to the semiconductor chip being thinned, and
   oscillator circuitry coupled to said capacitor for detecting said changed capacitance value and generating a tamper-detected signal.

3. The tamper detection circuit as recited in claim 2, wherein said capacitor is formed coincident with a Thru-Silicon Via (TSV) technology with the semiconductor chip including the circuitry to be protected.

4. The tamper detection circuit as recited in claim 2, wherein said capacitor structure has a reduced area between conductors of said capacitor structure responsive to the semiconductor chip being thinned, causing the capacitance value to decrease.

5. The tamper detection circuit as recited in claim 2, wherein said oscillator circuitry includes a ring oscillator, and further includes a resistor and said capacitor providing an input to said ring oscillator.

6. The tamper detection circuit as recited in claim 5, wherein said ring oscillator includes a plurality of series connected inverters connected together to form a ring with a last of the series connected inverters connected by the resistor and said capacitor to an input of the first of the series connected inverters.

7. The tamper detection circuit as recited in claim 6, wherein a capacitance value of said capacitor decreases responsive to the semiconductor chip being thinned causing said ring oscillator to begin to oscillate, providing the tamper-detected output signal.

8. A tamper detection method for implementing tamper and anti-reverse engineering evident detection in a semiconductor chip comprising:
   forming a capacitor with the semiconductor chip including circuitry to be protected; said capacitor being arranged to provide a changed capacitance value responsive to the semiconductor chip being thinned, said changed capacitance value indicating a tampering event in the semiconductor chip; and
   providing ring oscillator circuitry including a plurality of inverters series connected in a ring with a last of the series of inverters coupled to said capacitor and coupled by a resistor to an input of the first of the series inverters; said ring oscillator circuitry detecting said changed capacitance value; oscillating and generating a tamper-detected signal.

9. A tamper detection method for implementing tamper and anti-reverse engineering evident detection in a semiconductor chip comprising:
   forming a capacitor with the semiconductor chip including circuitry to be protected includes forming a conical capacitor structure including an etched trench extending from proximate to the backside of a silicon-on-insulator (SOI) structure into a silicon substrate layer to a buried oxide layer, a capacitor dielectric formed on sidewalls of said etched trench, and a thermal and electrical conductor deposited on said capacitor dielectric filling said etched trench; said capacitor being arranged to provide a changed capacitance value responsive to the semiconductor chip being thinned, and
   providing oscillator circuitry coupled to said capacitor for detecting said changed capacitance value and generating a tamper-detected signal.

10. The tamper detection method as recited in claim 9 wherein forming the capacitor with the semiconductor chip includes forming the capacitor coincident with a Thru-Silicon Via (TSV) technology with the semiconductor chip.

11. The tamper detection method as recited in claim 9 includes forming the capacitor to provide a reduced area between conductors of the capacitor responsive to the semiconductor chip being thinned, causing the capacitance value to decrease.

12. The tamper detection method as recited in claim 9 wherein providing said oscillator circuitry includes providing a ring oscillator, and further includes providing an input to said ring oscillator with a resistor and said capacitor.

13. The tamper detection method as recited in claim 12 includes providing said ring oscillator defined by a plurality of series connected inverters connected together to form a ring with a last of the series of inverters connected by the resistor and said capacitor structure to an input of the first of the series inverters.

14. The tamper detection method as recited in claim 12 wherein a capacitance value of said capacitor structure decreases responsive to the semiconductor chip being thinned causing said ring oscillator to begin to oscillate, providing the tamper-detected output signal.

15. A design structure embodied in a machine readable medium used in a design process, the design structure comprising:
- a tamper detection circuit tangibly embodied in the machine readable medium used in the design process, said tamper detection circuit for implementing tamper and anti-reverse engineering evident detection in a semiconductor chip, said tamper detection circuit including
- a capacitor, said capacitor being formed with the semiconductor chip including circuitry to be protected; said capacitor including a conical capacitor structure, said conical capacitor structure including an etched trench extending from proximate to the backside of a silicon-on-insulator (SOI) structure into a silicon substrate layer to a buried oxide layer, a capacitor dielectric formed on sidewalls of said backside etched trench, and a thermal and electrical conductor deposited on said capacitor dielectric filling said etched trench;
- said capacitor having a changed capacitance value responsive to the semiconductor chip being thinned,
- oscillator circuitry coupled to said capacitor for detecting said changed capacitance value and generating a tamper-detected signal, wherein the design structure, when read and used in the manufacture of a semiconductor chip produces a chip comprising said tamper detection circuit.

16. The design structure of claim 15, wherein the design structure comprises a netlist, which describes said tamper detection circuit.

17. The design structure of claim 15, wherein the design structure resides on storage medium as a data format used for the exchange of layout data of integrated circuits.

18. The design structure of claim 15, wherein the design structure includes at least one of test data files, characterization data, verification data, or design specifications.

19. The design structure of claim 15, wherein said capacitor is formed coincident with a Thru-Silicon Via (TSV) technology with the semiconductor chip including the circuitry to be protected.

20. The design structure of claim 15, wherein said capacitor includes a reduced area between conductors of said capacitor responsive to the semiconductor chip being thinned, thereby causing the capacitance to decrease.

* * * * *